Jan. 12, 1971   R. H. GARST ET AL   3,554,986
POLYSULFITE OF 2,2,4,4-TETRAALKYLCYCLOBUTANE-1,3-DIOLS
Filed Sept. 21, 1967   3 Sheets-Sheet 3

INVENTORS
ROGER H. GARST
JOSEPH P. HENRY
BY R. J. Eichelberg
ATTORNEY

United States Patent Office 3,554,986
Patented Jan. 12, 1971

3,554,986
POLYSULFITE OF 2,2,4,4-TETRAALKYL-CYCLOBUTANE-1,3-DIOLS
Roger H. Garst and Joseph P. Henry, South Charleston, W. Va., assignors to Union Carbide Corporation, a corporation of New York
Filed Sept. 21, 1967, Ser. No. 669,650
Int. Cl. C08f 13/00
U.S. Cl. 260—79.3
11 Claims

ABSTRACT OF THE DISCLOSURE

Novel polysulfites prepared from 2,2,4,4-tetramethyl-cyclobutane-1,3-diol and thionyl chloride for example are disclosed. These polymers may be used for the manufacture of plastic fibers, films and the like.

---

The present invention relates to novel polysulfites of 2,2,4,4-tetraalkylcyclobutane-1,3-diols and a method for preparing them.

The novel composition of the invention has the following formula:

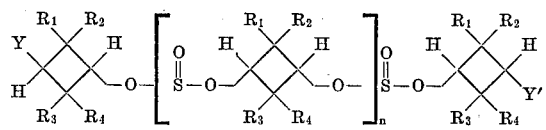

The radicals $R_1$, $R_2$, $R_3$ and $R_4$ in the above formula may be alike or different alkyl groups and Y and Y' may be alike or different and are selected from the group consisting of alkoxy, aryloxy, hydroxyl, halo, halosulfinyl and lower alkylsulfinyl or arylsulfinyl and $n$ has a value from about 1 to about 200 or higher.

The preferred alkyl groups comprise lower alkyl groups especially alkyl groups of 1 to about 4 carbon atoms, for example methyl, ethyl, propyl, isopropyl, butyl, isobutyl, tertiary butyl and the like, whereas the preferred aryl groups may be phenyl, substituted phenyl, benzyl, alkylbenzyl, naphthyl, alkylnaphthyl when the alkyl group has from 1 to about 4 carbons and the like. The halogen or halogenated substituents represent by Y and Y' may comprise chlorine or chlorinated moieties although other halogen compounds are within the broad scope of the invention; viz, fluorine, bromine and iodine containing moieties or these halogens per se. Y and Y' are preferably alkoxy, aryloxy, alkyl sulfinyl, arylsulfinyl or halogen.

Figure 1:
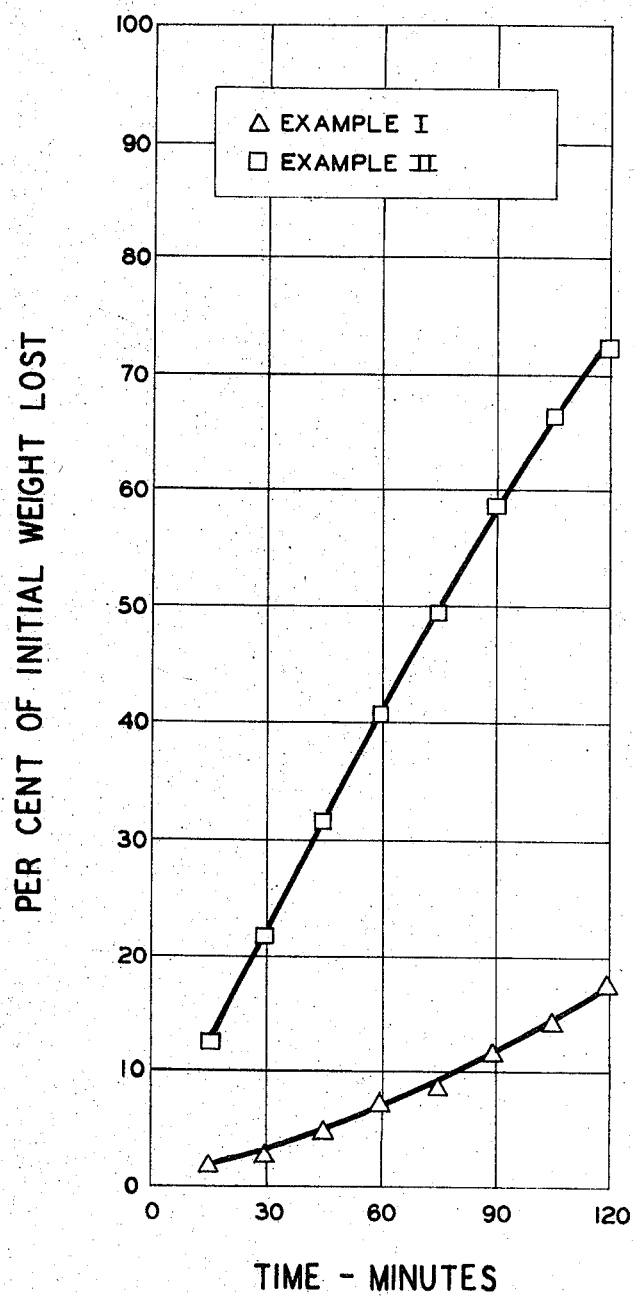
Figure 2:
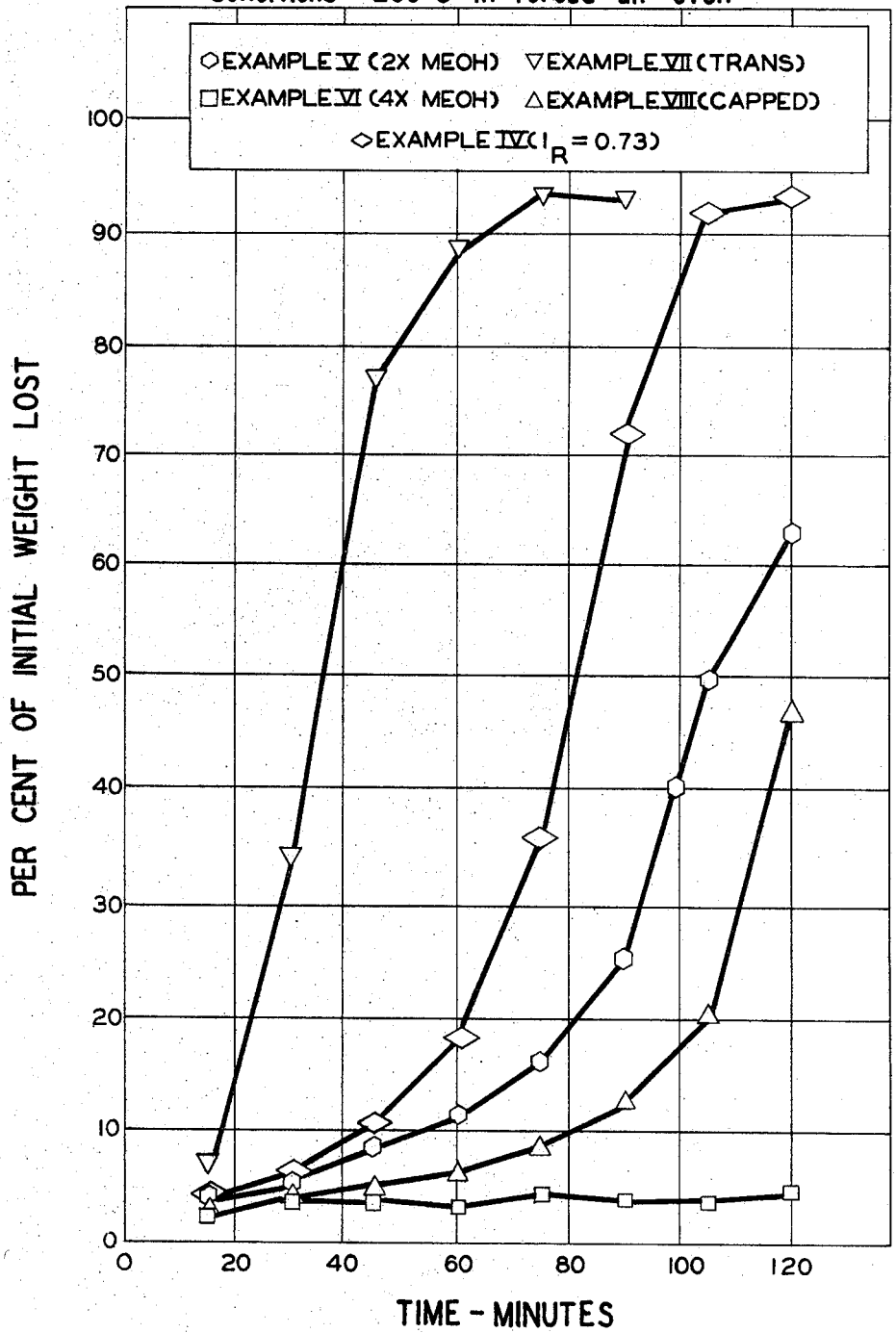
Figure 3:
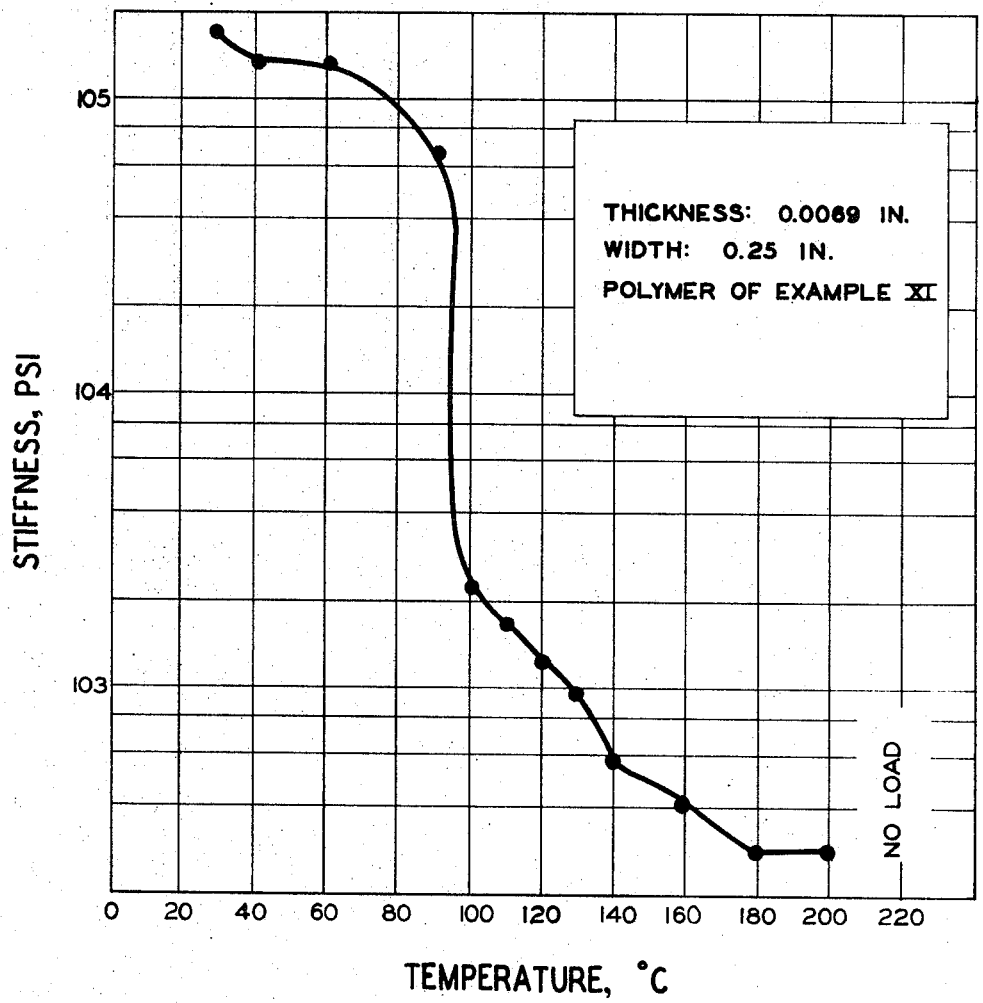

The compounds of the present invention have been designated polysulfites since they are analogous to organic sulfites which are double esters of sulfurous acid which has the hypoethetical structure $(OH)_2S=O$. For example, the reaction product of thionyl chloride and phenol would be diphenyl sulfite whereas thionyl chloride reacted with ethanol and methanol would be designated ethylmethyl sulfite. The polymers of the present invention which have been prepared by reacting alkyl substituted cyclobutane diols with thionyl chloride have been designated polysulfites of the diol. Even though the preferred method of preparing these polymers comprises the reaction of the diol with a thionyl halide, identical polysulfites may be obtained by ester exchange procedures. Accordingly, by the expression polysulfites of 2,2,4,4-tetraalkylcyclobutane-1,3-diols, it is intended to include any polymer having the structure obtained by reacting thionyl halides with 2,2,4,4-tetraalkylcyclobutane-1,3-diols whether or not the thionyl halide synthesis is used to obtain the product, The physical properties of polysulfites produced according to the invention are illustrated in FIGS. 1, 2 and 3.

Although the inventors do not wish to be limited by any theory, it is believed that the terminal groups Y and Y' in the above polymer comprise hydroxyl or methyl sulfinyl groups for the most part. Investigation of the polymers obtained so far does indicate that the radicals Y and Y' may be halo, halosulfinyl, hydroxyl, lower alkylsulfinyl and arylsulfinyl.

The 2,2,4,4-tetramethylcyclobutane-1,3-diol (TMCBD) employed in manufacturing the polymers of the present invention exists in one of two isomeric forms comprising either the cis configuration:

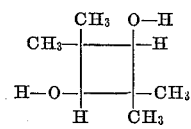

or the trans configuration:

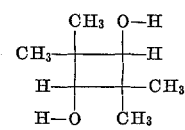

Accordingly either cis or trans diols may be used as starting materials for preparing the polymers disclosed herein. Additionally, mixtures of cis and trans diols may be employed and it is intended by the expression "comprising cis diols" to include cis diols as well as mixtures of mostly the cis and some trans diols and other diols that may be employed in manufacturing polysulfites. It is also intended by the expression "comprising trans diols" to include trans diols as well as mixtures of mostly trans and some cis diols and other diols that may be employed advantageously in preparing polysulfites.

When the polysulfites of the present invention are prepared by the reaction of a thionyl halide and 2,2,4,4-tetraalkylcyclobutane-1,3-diol, the reaction is effected at temperatures from about −50 to about 150° C. especially about 10 to about 50° C., preferably from about 15 to about 30° C. The present invention may be practiced at and is operable at reduced or higher pressures with respect to atmospheric however no advantage is incurred save convenience. The ratios of the diol to the thionyl halide may also vary from about 1.0:0.5 to 1.0:3.0, especially about 1.0:1.0. The method of the present invention is operable at subatmospheric, atmospheric and higher pressures, optimum pressure being easily determined by a person having ordinary skill in the art.

The reaction is carried out in the presence of a tertiary amine such as pyridine. Other tertiary amines may also be employed an include either the heterocyclic tertiary amines, aliphatic tertiary amines, or alicyclic tertiary amines well known in the art. Amines in addition to pyridines that may be employed as catalysts include quinoline, pyrimidine, trimethylamine, triethylamine, tripropylamine, tributylamine, triamylamine, methyldiethylamine and the various isomers thereof. The preferred class of amines have the general formula:

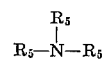

where the radical $R_5$ comprises any alkyl group, especially a lower alkyl group such as an alkyl group having from 1–5 carbon atoms or a cyclic or aromatic group such as phenyl, naphthyl or alkyl substituted phenyl and/or naphthyl and $R_5$ may be the same or different. In addition to the above tertiary amine, the preferred amines also comprise cyclic amines of the general formula:

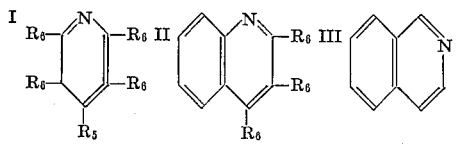

where the radical $R_6$ is hydrogen or a lower alkyl such as an alkyl having from 1–5 carbon atoms. $R_6$ may be the same or different.

In another aspect of this invention it has been discovered that by careful reprecipitation of the polymer improved results may be obtained with respect to heat stability. Working up the polymer after polymerization is complete may be effected several different ways, however the preferred manner comprises dissolving the polymer formed in a suitable solvent such as chloroform and precipitating it from the chloroform solution or other appropriate solvent by pouring the solution into a nonsolvent such as an alcohol, preferably a lower alkanol such as alcohols containing from 1 to about 5 carbon atoms which are known in the art including methanol, ethanol, propanol, isopropanol, butanol, pentanol and the isomers thereof. The term solvent and non-solvent are relative terms used to describe liquids in which the polymer is either soluble or nonsoluble and may be determined by a person having ordinary skill in the art. In addition to chloroform however, it has been found that the polymer of the present invention is also soluble in pyridine and benzene. Appropriate non-solvents include methanol in the cases of chloroform or benzene and water in the case of pyridine.

Although the applicants do not wish to be limited by any theory it is believed that in the presence of excess thionyl chloride Y and or Y′=OSOCl, and treatment with —OSOCl reactive compounds such as those having the structure $R_6OH$ in which $R_6$ is alkyl e.g., lower alkyl such as 1–5 carbon atoms and isomers thereof; phenyl, naphthyl or alkyl and/or hydroxy substituted phenyl naphthol, and the like conversion of the theoretical terminal sulfinyl chloride into an organo sulfinyl group, can be effected; e.g., —$OSO_2CH_3$ in the case of methanol treatment. Other compounds suitable for reaction with the —OSOCl group where Y=—OSOCl include any aliphatic alcohol or aliphatic primary amines or secondary amines free of hydrogen on the β carbon atom such as the tertiary alcohols having from about 4 to about 8 carbon atoms methyl amine, dimethyl amine, aniline and the like. Additionally, phenols e.g. alkyl phenols, especially lower alkyl phenols where said lower alkyl group has from 1 to about 4 carbon atoms, cresols, naphthols and the like may be used in this respect. In some instances these compounds serve a dual function in that they may also be used as a solvent or non-solvent as described previously.

The polysulfites of this invention may be used as thermoplastic molding materials for the formation of molded objects such as containers and the like or may be drawn into fibers and filaments and may also be used as coating materials. The thermostability of the polysulfite at 200°C. is an outstanding and distinguishing property of the polysulfites produced using 2,2,4,4-tetramethylcyclobutane-1,3-diol as one of the co-reactants. This heat stability is significant in that the polysulfite may be heat softened in the course of forming or drawing operations without decomposition. In addition to the above applications the polysulfites may also be extruded or drawn into film, rods or bars. The polysulfites prepared from TMCBD are partially crystalline and may be used in applications requiring a glass transition temperature of well above 96° C. such as tubing for high temperature applications; e.g., the conveyance of hot liquids.

Polysulfites of TMCBD have also been solvent cast as clear thin films which show no apparent tendency to discolor over extended periods of exposure to air.

In the following examples, the reduced viscosities were determined according to the following formula:

$$I_R = \frac{\frac{\text{Viscosity of Resin in solution}-}{\text{Viscosity of solvent}}}{\text{Viscosity of solvent}}$$
$$\text{Resin Concentration in Solution}$$

where the solvent is chloroform and concentration of resin in solvent (g./100 ml.)

EXAMPLE I

Pyridine (160 g.; 2.0 mole) and 145 g. (1.0 mole) of 2,2,4,4-tetramethylcyclobutane-1,3-diol about 50 mole percent of which comprised the trans isomer and the balance being cis isomer, are placed in a two-liter 4-neck flask fitted with a Friedricks condenser, thermometer, Teflon paddle stirrer and 250 ml. compensating addition funnel. Thionyl chloride (230 g., 1.93 mole) is added dropwise with stirring.

The temperature initially decreases to 10° and then slowly increases as a precipitate forms. An additional 90 g. of pyridine is added and when about one-third of the thionyl chloride is added the temperature is raised to 80°. As some precipitate is still present a 200 g. portion of pyridine is added and thionyl chloride addition continued. The amount of precipitate continues to increase until a gummy polymeric substance forms when three-quarters of the thionyl chloride is added. The reaction mixture is then discharged into a 2-liter beaker and allowed to cool.

The polymer is formed and found to be soluble in benzene or chloroform, but insoluble in water or warm 10% aqueous sodium hydroxide. The cooled mass of reaction product is broken into chunks, and pulverized in a "Waring Blendor" (trademark) with water. A tan solid is recovered which is insoluble in water, methanol and warm 10% sodium hydroxide, but easily soluble in chloroform or benzene. A chloroform solution of the solid poured into excess methanol gives a white fibrous precipitate. The tan solid and the white precipitate both burn with a sulfurous odor leaving no residue.

The maximum amount of crude material was dissolved in 100 ml. of chloroform at room temperature, washed with 100 ml. of water and added dropwise to 900 ml. of vigorously stirred methanol giving a white precipitate. Repeating this procedure afforded, after drying in vacuo, 17 g. of white fibrous polysulfite M.P. 219.5–226.5°.

The remainder of the crude polymer is purified in the same way omitting the water wash. The yield is 120 g.

The polysulfite was found to have a reduced viscosity (0.2 g. in 100 ml. $CHCl_3$, 30°) of $I_R=0.36$. Elemental analysis found (percent by wt.): C=49.57; H=7.10, S=16.15; calculated for $R_1$, $R_2$, $R_3$, $R_4$=$CH_3$, $n=150$, Y=Y′=Cl:C=50.52, H=7.42, S=16.75.

Proton magnetic resonance spectrum (60 mc. in $CDCl_3$)—tau value, signal multiplicity, identity: 5.76, singlet, cis-1,3-hydrogen; 5.93, singlet, trans-1,3-hydrogen; 8.79 and 8.88, doublet, cis-methyl group; 8.83, singlet, trans-methyl groups.

Infrared (1% KBr pellet)—3.36 m. (strong) and 3.46 m. (medium) aliphatic C—H; 6.18 m. (weak); 6.80 m. (strong) tertiary C—H; 7.22 and 7.28 m. doublet (medium) geminal $CH_3$-groups; 8.24–8.37 m. (broad, strong) sulfite; 9.2, 9.4 and 9.7 m. (weak); 10.1–10.6 m. (broad, strong); 12.58 m. (weak); 13.1–13.7 m. (broad, strong).

FIG. 1 illustrates the heat stability of the polysulfite polymer prepared in this example.

EXAMPLE II

The method of Example I is repeated using 145 g. (1.0 mole) of 2,2,4,4-tetramethylcyclobutane-1,3-diol and three liters of dry pyridine. The reaction mixture is warmed to 60° and stirred giving a clear solution. One hundred and forty five (145) ml. (230 g., 1.93 mole) of thionyl chloride is added over a two hour period at a rate to maintain a 60° reaction temperature. When the addition is complete the stirrer is stopped and the reaction mixture allowed to stand overnight.

After cooling a small amount of precipitate is collected, by filtration. Water solubility of the solid indicates the formation of pyridine hydrochloride which is discarded. Pyridine is stripped from the reaction mixture at reduced pressure aided by a rotary evaporator. Solid material which separates during this process is treated with excess water in a "Wearing Blendor" and collected. The polymer obtained is dissolved in a minimum quantity of chloroform and precipitated by dropwise addition into a nine-fold excess of rapidly stirring methanol. This treatment is repeated and the purified polymer thoroughly pulverized in a "Waring Blendor" with about two liters of methanol as non-solvent. The purified polymer is collected by filtration and dried in vacuo. The yield is 92 g. M.P. 215–220° dec.

The polysulfite was found to have a reduced viscosity (0.2 g. in 100 ml. CHCl$_3$, 30°) of $I_R$=0.44. Elemental analysis found (percent by wt.): C=49.90, H=7.23, S=17.47.

The proton magnetic resonance spectrum of the polysulfite polymer exhibited the same chemical shifts and multiplicities described for Example I.

FIG. 1 illustrates the heat stability of the polysulfite polymer prepared in this example.

The polymers prepared as set forth in Examples I and II are compared with regard to heat stability over a four hour period at 200° C. in a forced air oven. Heat stability in this instance is measured as a function of percentage loss of initial weight. The results of the heat stability evaluation are plotted as shown in the graph marked FIG. 1.

The polymer of Example I is hydrolyzed in order to confirm the incorporation of the diol in the polysulfite as a cyclic monomer. The method for hydrolysis and the analysis of the hydrolysis by-products are given below in Example III.

EXAMPLE III

Basic hydrolysis of polysulfite polymer I

The polymer of Example I (100 g., 0.052 mole of polymer units when $R_1=R_2=R_3=R_4=CH_3$ and $Y=Y^1=Cl$) is dissolved in a solution prepared from 1.0 g. (0.043 mole) of sodium metal, 100 ml. of methanol and 150 ml. of benzene. The clear solution is magnetically stirred at ambient temperature for 25 hours and then neutralized with 4.5 ml. of glacial acetic acid and the solvent removed with a rotary evaporator.

The residue is boiled with 150 ml. of toluene, filtered to remove sodium acetate and reduced in volume to 75 ml. From the cooled toluene there was collected 2.5 g. of pure cis-2,2,4,4-tetramethylcyclobutane-1,3-diol. M.P. 161.5–163.0°. (Lit. value 162.5–163.5°). The infrared spectrum (Nujol mull) exhibited the 12.2 micron absorption characteristics of cis-TMCBD. The p.m.r. spectrum in deuteriochloroform confirmed the identification and consisted of a singlet, 6.68 t., relative intensity 1.0 assigned to —CH—OH and a doublet, 8.94 t. and 9.01 t., relative intensity 6.1 assigned to CH$_3$.

An additional one gram of a mixture of cis and trans-TMCBD was obtained from the filtrate and by rewashing the sodium acetate with hot toluene M.P. 120–126°. The infrared absorption (Nujol mull) of this material at 11.8 microns identified it as predominately trans-TMCBD.

The following polysulfites are prepared for the purpose of obtaining polymers of different reduced viscosities and yields, and to study the various effects of cis and trans-TMCBD in the polymer. Additionally the polysulfites of the following examples are examined by proton magnetic resonance studies (p.m.r.) to confirm the cyclic diol structure of the polysulfite, and to determine the ratio of cis and trans-TMCBD in the polysulfite.

EXAMPLE IV

The method of Example II is repeated using 72.1 g. (0.5 mole) of 2,2,4,4-tetramethylcyclobutane-1,3-diol and 1.5 liters of dry pyridine. With stirring the diol is dissolved at room temperature to give a clear solution. Over a period of 2 hours 82 g. (0.69 mole) of thionyl chloride is slowly added with stirring to maintain a reaction temperature of 25–30° C. Stirring is continued an additional 10 minutes and then for another 35 minutes as the mixture is cooled to 0°.

A small portion of precipitate is removed by filtration and the rapidly darkening filtrate is poured into a two liter beaker. Upon addition of about two liters of distilled water to the rapidly stirring pyridine solution there is precipitated a copious quantity of polysulfite polymer. The precipitate is washed by grinding with distilled water in a Waring Blendor (trademark) until the wash is water white. Final workup is effected as described in Example II by precipitation from 400 ml. of CHCl$_3$ into 3.6 liters of methanol. There is obtained after drying in vacuo 88 g. of snow white TMCBD-polysulfite M.P. 221–227°.

Infrared and p.m.r. spectra of this material are essentially as described in Examples I and II above. Elemental analysis found (percent by wt.): C=50.25, H=7.36. The polysulfite is found to have $I_R$=0.73.

Additional properties of the polysulfite of this example may be found in Tables I, II and III as well as FIGS. 2 and 3.

EXAMPLE V

The method of Example IV is repeated using 144.2 g. (1.0 mole) of 2,2,4,4-tetramethylcyclobutane-1,3-diol and 146 g. (1.21 mole) of thionyl chloride in three liters of pyridine. Aided by a cooling bath the thionyl chloride is added in 35 minutes, the mixture chilled to 5° and filtered. The polysulfite is precipitated from the filtrate in the usual manner with water followed by two reprecipitations from CHCl$_3$ into rapidly stirred nine fold excesses of methanol in a Waring Blendor (trademark). The yield is 178 g. of snow white TMCBD-polysulfite, M.P. 223–226°, after drying in vacuo.

Infrared and p.m.r. spectra of this material are essentially as described in Examples I and II above. Elemental analysis found (percent by wt.): C=50.16, H=7.59; a reduced viscosity of $I_R$=0.54 was measured.

Additional properties of the polysulfite of this example may be found in Tables I and II as well as FIG. 2.

EXAMPLE VI

The polysulfite of Example V above is precipitated two additional times from CHCl$_3$ into methanol using the method described in that example. Polysulfite treated in this way demonstrates excellent heat stability as shown in FIG. 2. After 120 minutes at 200° in a forced air oven, the reduced viscosity ($I_R$) changed only from 0.43 to 0.39. The original appearance of the polysulfite (white, fluffy fibers) remained unchanged while all of the less stable samples turned brown, melted, and decomposed with evolution of sulfurous vapors.

EXAMPLE VII

A mixture of 0.35 mole of 2,2,4,4-tetramethylcyclobutane-1,3-diol comprising 67.5 percent trans and 32.5 percent cis isomers is dissolved in 1040 ml. of pyridine. Over a period of 120 minutes at a temperature of 22–28° 0.38 mole of thionyl chloride is added. After 15 minutes additional stirring the reaction mixture is worked up as has been described in Example V. There is obtained 57 g. of polysulfite M.P. 190–193°, $I_R$=0.14 with consistent analysis, p.m.r. and IR spectra. The product is significantly enriched in trans-TMCBD as compared with other examples (Table I), but its heat stability is poor (FIG. 2). Other data are given in Table II.

EXAMPLE VIII

The method and conditions of Example IV above are repeated as nearly as possible until the addition of thionyl chloride is completed. After 15 minutes additional stirring 64 g. (2.0 moles) of methanol is rapidly added and the temperature rises from 25 to 34°. The reaction mixture is chilled to about 5° and filtered. Treatment of the filter cake and filtrate with large amounts of water followed by two reprecipitations from CHCl$_3$ into methanol and drying in vacuo yield 87 g. of polysulfite M.P. 214–217°.

Infrared and p.m.r. spectra are consistent with those of Examples I and II. A reduced viscosity of $I_R$=0.33 is found. Other data are given in Tables I and II.

FIG. 2 shows that although the previous high reduced viscosity of Example IV was not duplicated (0.33 vs. 0.79), the polysulfite of this example treated with methanol before workup has a much improved heat stability, but not as good as that of Example VI.

EXAMPLE IX

A two-liter 4-neck reaction flask is fitted with a Teflon paddle stirrer, thermometer, addition funnel (50 ml. buret equipped with a 24/40 standard taper joint and Teflon stopcock) and Friedricks condenser. Provision is made for maintaining a reaction temperature near 25°. Evolved gases are conducted through a mineral oil bubbler prior to venting.

TMCBD (72 g., 0.5 mole) is dissolved with stirring in 1500 ml. (ca. 18.6 moles) of pyridine and the temperature adjusted to about 25°. Thionyl chloride (72 g., 0.606 mole) is charged to the buret and added at a rate of 2 ml./min. for the first ten minutes. During the next 10 minutes the rate is 1 ml./min. followed by a decrease to 0.35 ml./min. for the next 20 minutes. At this point stoichiometry is reached and the reaction is stirred for one hour. The addition of $SOCl_2$ is resumed and completed in 20 minutes followed by a 30 minute stirring period. The reaction is chilled and 32 g. (1.0 mole) of methanol added.

The dark reaction mixture obtained is transferred to a 6-liter beaker and diluted with 4 liters of water while being rapidly stirred. Precipitated TMCBD polysulfite is collected, washed with water and air dried. Concentrated solutions in chloroform are prepared and precipitated into 9 volumes of methanol in a Waring Blendor (trademark). After two precipitations followed by vacuum drying (steam jet) to constant weight in a desiccator over $CaCl_2$ there is obtained 88 g. of TMCBD polysulfite. M.P. 217–220° C.

Infra-red and p.m.r. spectra of this polysulfite were essentially as described in Examples I and II. A reduced viscosity of $I_R$=0.30 was obtained. Additional data is found in Tables I and II.

The polysulfites of Examples I, II, IV, V, VII, VIII and IX were analyzed by p.m.r. techniques to determine the isomeric structural content of cis and trans-2,2,4,4-tetramethylcyclobutane-1,3-diol. The results of these investigations are summarized below in Table I.

TABLE I.—ISOMERIC STRUCTURAL CONTENT OF TMCBD POLYSULFITES OBTAINED BY P.M.R. ANALYSIS IN CDCl₃

| Example: | Percent cis | Percent trans |
|---|---|---|
| I | 50.0 | 50.0 |
| II | 54.4 | 45.6 |
| IV | 56.5 | 43.5 |
| V | 55.7 | 44.3 |
| VII | 35.5 | 64.5 |
| VIII | 51.6 | 48.2 |
| IX | 52.8 | 47.2 |

The results of the polymerization reactions exemplified in Examples I, II, IV, V, VII, VIII and IX are summarized below in Table II.

TABLE II

| Example | Percent yield | $I_R$ | Reaction temp., °C. | Weight percent excess $SOCl_2$ |
|---|---|---|---|---|
| I | 72.1 | 0.36 | 20–60 | 50 |
| II | 48.4 | 0.44 | 60 | 40 |
| IV | 92.6 | 0.73 | 25–30 | 38 |
| V | 93.7 | 0.54 | 20–22 | 22 |
| VII | 85.7 | 0.14 | 22–28 | 10 |
| VIII | 91.7 | 0.33 | 25–27 | 44 |
| IX | 92.5 | 0.30 | 23–30 | 20 |

EXAMPLE X

The polysulfite of Example IV above (1.0 g.) was dissolved in 9.0 g. of $CHCl_3$. This solution was cast into a film approximately 4 inches by 4.5 inches using a 0.050 inch doctor knife on a clean glass plate.

After 1.5 hours curing at room temperature in air, the glass plate was submerged in water causing the film to separate and float on the surface. A slightly hazy, static charged, transparent film was obtained which did not appear wetted by water. The film was flexible and relatively strong. It could be stretched before tearing. Thinner films cast from less concentrated solutions are completely clear.

EXAMPLE XI

The polysulfite of Example IV above was prepared as a 15 percent by weight solution in $CHCl_3$ and poured to a depth of 3/16 inch in a Petri dish. In 3 hours the solvent had mostly evaporated and the film was loosened under water. Curing consisted of about 28.5 hours at room temperature and 0.05–0.025 mm. Hg followed by 16 hours at 55° and 1.0 mm. Hg. Weight loss under this treatment was 0.0747 g. to a final weight of 1.6921 g. A hazy transparent film which made a "crinkling" sound on flexing was obtained. Stiffness modulus and other physical properties of this material are reported in Table III and FIG. 3.

TABLE III

Physical properties of TMCBD polysulfite of Example XI

Stiffness modulus, p.s.i. (25°)—175,000
Elongation, percent—10
Tensile, p.s.i.—3,570
Tg, ° C.—96
No load, ° C.—220

When the diols and other reactants which have been described, both generally and specifically are reacted according to the methods of the foregoing examples substantially the same results are obtained.

Thus there has been described a novel polysulfite prepared by the reaction of thionyl halide with a diol such as 2,2,4,4-tetraalkylcyclobutane-1,3-diol as well as a method for improving the heat stability of the polysulfites obtained by washing the polymer in a solvent and precipitating the solution prepared by introducing it into a nonsolvent organic hydroxy compound.

Although the invention has been described by reference to certain embodiments, it is not intended that the novel polysulfites nor the method for improving the heat stability of such polysulfites be limited thereby but that certain modifications are intended to be included within the spirit and broad scope of the following claims.

What is claimed is:

1. A solid polysulfite of 2,2,4,4-tetraalkylcyclobutane-1,3-diol of the formula:

$$Y\underset{R_3\ R_4}{\overset{R_1\ R_2}{\diagdown\diagup}}H - O - \left[ \overset{O}{\underset{\|}{S}} - O - \underset{R_3\ R_4}{\overset{R_1\ R_2}{\diagdown\diagup}} - O - \right]_n \overset{O}{\underset{\|}{S}} - O - \underset{R_3\ R_4}{\overset{R_1\ R_2}{\diagdown\diagup}} Y'$$

where $R_1$, $R_2$, $R_3$ and $R_4$ may be the same or different lower alkyl groups and Y and Y' may be alike or different and are essentially organo sulfinyl groups of the formula —$OSO_2R'$. Where R' is selected from a member of the group consisting essentially of lower alkyl, phenyl, naphthyl, alkyl hydroxy phenyl, hydroxy phenyl, tertiary alkyl of from about 4 to about 8 carbon atoms, methyl amine, dimethyl amine and phenyl amine and n has a value of from 1 to about 200.

2. The polysulfite of claim 1 where said alkyl members comprise methyl radicals.

3. The polysulfite of claim 2 where said diol comprises cis-2,2,4,4-tetramethylcyclobutane-1,3-diol.

4. The polysulfite of claim 2 where said diol comprises trans-2,2,4,4-tetramethylcyclobutane-1,3-diol.

5. A method for preparing a solid polysulfite resin comprising contacting a 2,2,4,4-tetraalkylcyclobutane-1,3-diol with a thionyl halide in the presence of a tertiary amine catalyst, precipitating the polysulfite in a non-solvent and washing said percipitate until a heat stable polymer is obtained.

6. The method of claim 5 where said tertiary amine comprises pyridine.

7. The method of claim 5 where said alkyl comprises a lower alkyl group.

8. The method of claim 7 where said thionyl halide comprises thionyl chloride.

9. The method of claim 8 where said precipitate is washed by dissolving in a solvent followed by precipitation in a non-solvent.

10. The method of claim 9 where said solvent comprises chloroform and said non-solvent comprises a lower alkanol.

11. The method of claim 10 where said lower alkanol comprises methanol.

References Cited
UNITED STATES PATENTS

| | | | |
|---|---|---|---|
| 2,931,817 | 4/1960 | Gash et al. | 260—79.3 |
| 2,936,324 | 5/1960 | Hasek et al. | 260—617 |
| 3,068,102 | 12/1962 | Chiesa et al. | 260—79.3 |
| 3,179,683 | 4/1965 | Hubbard et al. | 260—79.3 |
| 3,272,854 | 9/1966 | Covey et al. | 260—456 |
| 2,465,915 | 3/1949 | Myles et al. | 260—456 |

JAMES A. SEIDLECK, Primary Examiner

U.S. Cl. X.R.

260—456